Figure 1:
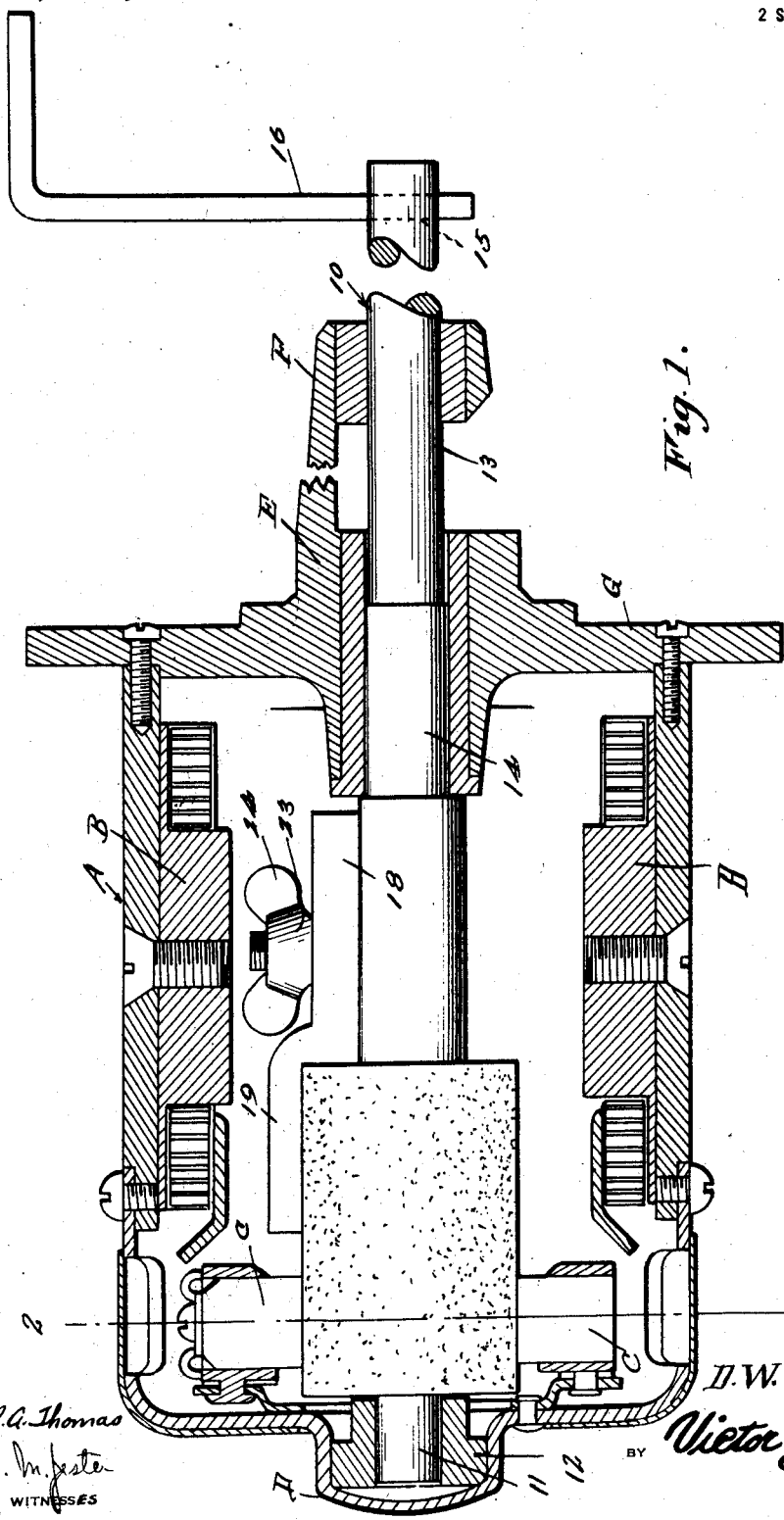

D. W. WARD.
COMMUTATOR BRUSH RESEATING TOOL.
APPLICATION FILED JULY 12, 1920.

1,395,880.

Patented Nov. 1, 1921.
2 SHEETS—SHEET 1.

D. W. Ward INVENTOR

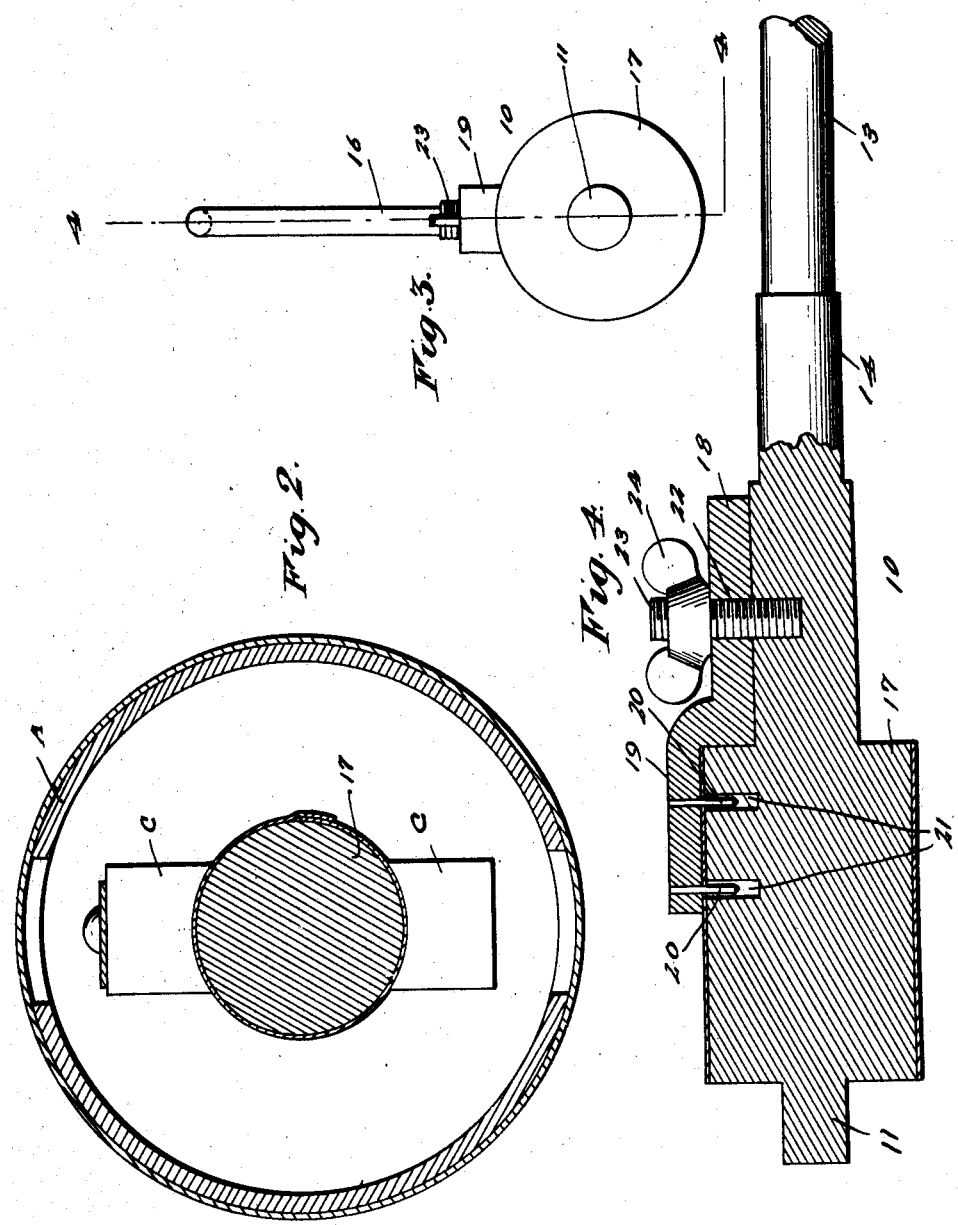

UNITED STATES PATENT OFFICE.

DANIEL WEBSTER WARD, OF MEMPHIS, TENNESSEE.

COMMUTATOR-BRUSH-RESEATING TOOL.

1,395,880. Specification of Letters Patent. Patented Nov. 1, 1921.

Application filed July 12, 1920. Serial No. 395,656.

*To all whom it may concern:*

Be it known that I, DANIEL WEBSTER WARD, a citizen of the United States, residing at Memphis, in the county of Shelby and State of Tennessee, have invented new and useful Improvements in Commutator-Brush-Reseating Tools, of which the following is a specification.

This invention relates to devices for refacing the commutator brushes of electric motors and generators and has for its object the provision of a mandrel adapted to be inserted in place of the armature of such a device and having a portion corresponding in size to the armature of such a machine and adapted to have wrapped thereabout a piece of sand paper or the like to be engaged by the commutator brushes so that when the mandrel is rotated the brushes will be refaced or dressed so that when the armature and commutator are replaced in position the brushes will have the proper engagement therewith.

An important object is the provision of a device of this character which has a bearing portion at each end of the mandrel provided with a removable bushing which may be used in case the bearing of the electric machine is not of the same size as the bearing portion of the mandrel.

An additional object is the provision of a device of this character which will be simple and inexpensive in manufacture, highly efficient in use, a great labor saver, durable in service, and a general improvement in the art.

With the above and other objects and advantages in view, the invention consists in the details of construction to be hereinafter more fully described and claimed, and illustrated in the accompanying drawings in which—

Figure 1 is a horizontal sectional view through an electric generator or motor showing my device associated therewith, Fig. 2 is a cross sectional view on the line 2—2 of Fig. 1, Fig. 3 is an elevation of my device detached and showing it at right angles to the position shown in Fig. 1, and Fig. 4 is a cross sectional view on the line 4—4 of Fig. 2.

Referring more particularly to the drawings the letter A designates an electric machine which may be a motor or a generator and which includes the usual pole pieces B between which the armature, not shown, rotates. The letter C designates the brushes, either metallic or carbon which engage the commutator, not shown. Ordinarily the redressing or refacing of such brushes is a troublesome operation and is at best inaccurate when done merely manually by means of a file or other abrasive article or substance. It is with this fact in view that the present invention has been designed. The letters D and E designate the bearings of the electric machine through which the armature shaft, not shown, rotates.

In carrying out my invention I provide a mandrel 10 designed to be placed within the electric machine after the armature has been removed. At one end this mandrel 10 is reduced, as shown at 11, so that it may be journaled within the bearing D and if it should happen that this reduced end 11 is not of the same diameter as the bore of the bearing, I may make use of a bushing 12 of proper size disposed upon the reduced portion 11 so that proper disposition within the bearing may be had. The other end portion of the mandrel is reduced, as shown at 13, and intermediate its ends the mandrel is formed with a portion 14 and this reduced portion 13 and the portion 14 are journaled within the bearings E and F at the other end of the electrical device, it being observable that one end G of the electric device is removable, as is the ordinary practice so that the engagement of my mandrel within the electric device will be a simple operation.

At its outer extremity the reduced portion 13 is formed with a transverse hole 15 within which is engaged one end of a right angularly bent rod 16 serving as a crank handle to effect manual rotation of the mandrel.

Adjacent the reduced end 11 the mandrel is formed into a relatively large drum portion 17 of substantially the same diameter as the commutator of the electric device and this enlarged portion is designed to occupy the same position as the commutator.

Carried by the mandrel between the reduced portion 14 and the enlarged portion 17, is an angularly formed plate 18 which has a portion 19 extending along a part of the periphery of the enlarged portion 17 and this portion 19 of the plate carries pins 20 seating within recesses 21 within the drum portion 17. The plate 18 is provided with a hole 22 engaged upon a threaded stud 23 projecting from the mandrel and also engaged upon this stud is a clamping nut 24.

In the use of my device the nut 24 is loosened or removed so that the pins 20 may be withdrawn from the recesses 21. I then wrap a strip of sand paper, emery cloth, or the like about the drum 17 and then replace the plate 18 with the pins 20 passing through the sand paper and seating within the recesses 21. The nut 24 is then reëngaged upon the stud and screwed down so that the portion 19 of this clamping plate will operate to hold the sand paper or other abrasive material upon the drum. The device is placed within the electric machine as above indicated and as shown in Fig. 1, whereupon the brushes C will engage against the sand paper. The operator then grasps the handle 16 and rotates the mandrel a few times whereupon the bearing faces of the brushes will be resurfaced or dressed so as to have proper conforming engagement with the commutator when the armature and its associated parts of the electric machine are replaced in position.

From the foregoing description and a study of the drawings it will be apparent that I have thus provided a simply constructed and easily arranged device which may be easily operated for quickly refacing or dressing commutator brushes, the device being a great labor saver as well as making accurate work possible.

While I have shown and descrbied the preferred embodiment of my invention, it is of course to be understood that I reserve the right to make such changes in the form, construction, and arrangement of parts as will not depart from the spirit of the invention or the scope of the subjoined claim.

Having thus described my invention, I claim:

A grinding device comprising a mandrel adapted to have a sheet of abrasive covered material wrapped thereabout, and means for holding said sheet in position comprising a threaded stud projecting from one side of the mandrel, a bracket arm engaged upon said stud and adapted to engage against the rolled sheet of abrasive material, a plurality of pins extending from said bracket arm for penetrating the overlapping edges of the sheet of abrasive material, the mandrel being formed with recesses receiving said pins, and a clamping nut formed upon said stud engaging said bracket arm for holding the latter firmly in engagement with the sheet of abrasive material.

In testimony whereof I affix my signature.

DANIEL WEBSTER WARD.